United States Patent [19]

Chi et al.

[11] 4,364,732

[45] Dec. 21, 1982

[54] SIMULATED INTERACTIVE DIVIDING AND ALLOCATING PROCESS

[75] Inventors: Uli H. Chi, Kent; Mark R. Lembersky, Seattle, both of Wash.

[73] Assignee: Weyerhaeuser Company, Tacoma, Wash.

[21] Appl. No.: 251,557

[22] Filed: Apr. 6, 1981

[51] Int. Cl.³ .............................................. G09B 7/02
[52] U.S. Cl. ................................. 434/219; 434/323; 434/365
[58] Field of Search ........................ 434/225, 428–430, 434/86–88, 365–369, 335, 219, 262, 295, 296; 364/470, 420, 801, 300, 930.1, 941.2, 942.6, 200, 212, 323, 900, 173, 163

[56] References Cited

U.S. PATENT DOCUMENTS

| | | | |
|---|---|---|---|
| 2,501,520 | 3/1950 | Howard | 273/157 R |
| 3,339,182 | 8/1967 | Horwitz et al. | 364/470 |
| 3,569,683 | 3/1971 | Pugh | 364/470 |
| 3,596,068 | 7/1971 | Doyle | 364/470 |
| 3,875,389 | 4/1975 | McFadden et al. | 364/470 |

OTHER PUBLICATIONS

N. J. Denil, "*Language and Model for Computer Aided Design*", 1966, pp. 527–535.

*Primary Examiner*—Vance Y. Hum
*Assistant Examiner*—Leo P. Picard
*Attorney, Agent, or Firm*—Weyerhaeuser Company

[57] ABSTRACT

A relatively low-cost, portable, stand-alone visual training system interactively displays two dimensional representations of elongated objects on a viewing screen. An operator observes the elongated object and through an input device, such as an alpha numeric keyboard, divides the object into segments and allocates the segments according to preselected criteria. The results of the operator's decision are then calculated in a programmed data processor and compared visually with a predetermined result which is stored in memory for the particular object.

1 Claim, 5 Drawing Figures

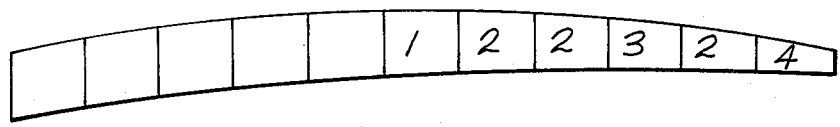
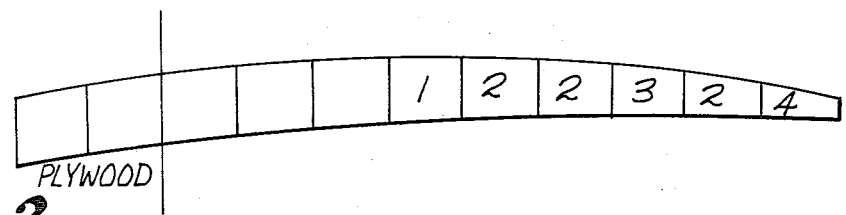

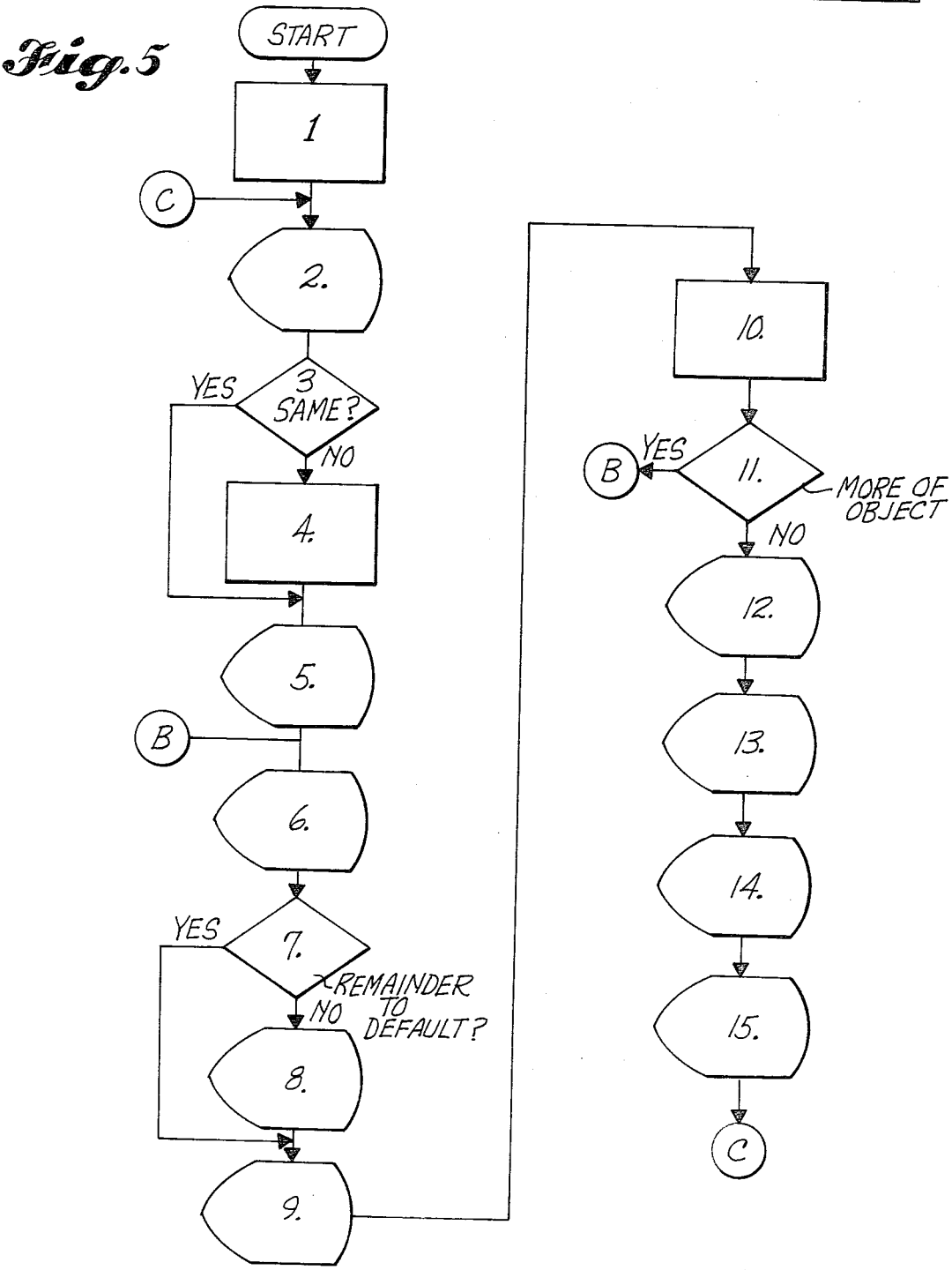

SIMULATED INTERACTIVE DIVIDING AND ALLOCATING PROCESS

BACKGROUND AND BRIEF SUMMARY OF THE INVENTION

This invention relates generally to a nondestructive training and analytical process, and more particularly, to one in which an elongated object dividing process is simulated so an operator can make decisions and compare his result with a predetermined result.

There are many industrial processes in which an elongated object, such as a tree-length log, is divided into smaller segments with the segments being allocated to a particular disposal. For example, in the process of merchandising long logs, logs are divided into segments of appropriate lengths and allocated to certain disposals depending upon the product to be generated. Log merchandising systems are well known and many are in use. One of the important considerations in merchandising long logs is the decision regarding segment lengths and disposals.

A merchandiser operator must have the decision-making ability to select the appropriately sized segments and allocate the segments to be disposed. Depending upon the array of product to be generated from the short segments, the operator must be trained and informed so he can make his decisions quickly and with a high degree of accurateness based upon preselected criteria.

As an example, when dividing long logs into segments, one disposal option is to "sawlog." In this case, the appropriate length and other physical characteristics will be determined based on the requirements for cutting a log into lumber, either for maximum yield or value. Another option is to "plywood." In this case, the appropriate length and other physical characteristics will be determined based on the requirements for peeling a log into veneer and manufacturing plywood. Another option is to "fiber." In this case, the appropriate length and other physical characteristics will be determined based on the requirements for converting the segments into chips for pulping. Thus, it is apparent the person responsible for making the decision must be trained and adequately informed as to what criteria he is to utilize in making the decision.

In the past, the training was conducted primarily through the use of lecture-study programs where an instructor would teach potential operators the skills needed. When new operators began to actually make operational decisions on real logs, their results were less than optimum. In addition, when existing operators had to learn new information because certain criteria for making the decisions had changed, they, too, after being exposed to the new information, often made less than optimum decisions. Unfortunately, when making operational decisions on real logs without having the maximum skill level, significant economic loss occurs.

By analogy, in the training of pilots, it is apparent an untrained pilot should not operate an aircraft without adequate training. In the field of pilot training, flight simulators have been developed that allow a pilot to essentially carry out the aircraft control process in the safety of the simulator. Flight simulators have become very sophisticated and today are computerized to simulate real flight conditions as much as possible. Just as a pilot operates an aicraft, so, too, does a merchandiser operator control the key aspects of deciding where to divide the long log and how segments should be allocated. It is apparent the merchandiser operator should have sufficient practice before being assigned to an actual operation.

Accordingly, one object of the present invention is the provision of a nondestructive training process for teaching users skills in dividing elongated objects and allocating segments.

Another object of the invention is the provision of a relatively low-cost, stand-alone interactive system utilizing a visual display and a data processor for simulating an elongated object dividing and allocating process.

Yet another object is the provision within the interactive system of displaying a comparison of user results with a predetermined result for the same object.

Still another object is the provision in the interactive system for the comparison display of cumulative results for a series of elongated objects.

These and many other objects of the invention will be better understood and more apparent upon reviewing the detailed description in conjunction with the attached drawings.

Briefly, the present invention is practiced in one form by providing to a user a visual display and input unit that is coupled to a programmed data processing system having a memory whereby the user can interactively simulate on the display unit an elongated object dividing and allocating process. A user will first call up from memory a visual representation of an elonged object and will then decide how best to divide and allocate the object. The user's decision is input to the data processor which is programmed to calculate a result for the user's decision. This result is then displayed along with a predetermined optimum result stored in memory. The user thereby gains an understanding of his decision-making ability against a predetermined optimum result based on a preselected set of standards.

BRIEF DESCRIPTION OF THE DRAWINGS

FIG. 1 is a representation of what the user may see on a screen when an elonged object is first displayed.

FIG. 2 is a representation of what the user sees after his first decision has been made and input to the system.

FIG. 3 is a representation of what the user sees after his complete decision has been made and the values calculated and displayed.

FIG. 4 is a representation of what the user may see on a screen after four objects have been processed and he desires to learn the cumulative results.

FIG. 5 is a logic flow chart outlining the steps within the process carried out on a stand-alone interactive programmed computer and visual display system.

DESCRIPTION OF THE PREFERRED EMBODIMENT

First, a brief description will be given of the hardware usable to carry out the process of the present invention. Each item of hardware is commercially available from various known sources within the computer industry. The overall computer and visual display system is essentially known, but must be selected and sized according to the amount of data to be included in the operational system. The structuring of the hardware will be well within the capabilities of a person having ordinary skill in the art as will the programs that are to be used to allow the computer to function properly on command.

For example, in the application of the invention where it is used to simulate the long log dividing and allocating or "merchandising" process, we have found a Tektronix computer and display system designated as poroduct 4052 having 56K of memory to be suitable. This particular system includes a general purpose digital computer, programmable to carry out predetermined data processing and display functions. The associated video display device is capable of drawing vectors. Providing the interactive means between the user and the computer system is a typical set of alpha numeric and programmable function keys arranged conveniently in a keyboard. Each key represents a separate programmable function switch that serves to control the data processing on an interruptable basis. The user controls the flow of the interactive process and provides inputs to the data processing hardware as required to carry out and complete the process.

Within the computer data processing system provided to carry out the process of the present invention will be a number of data items. The data items will be stored in the computer using convenient known storage media, although a system using magnetic tape with an associated drive means is preferred. One data item is a parameter table containing information which defines the allowable assignments or allocations of segments and allowable segment lengths for each allocation. At least one allocation must be available, which will be the default decision when the user fails to specify another allocation. These allocations and lengths correspond to function switches on the display hardware. As an example, when the simulated elongated object is a long log, an appropriate potential allocation for a segment will be as a plyblock, suitable for peeling into veneer and manufacturing plywood, and having a predetermined length of approximately eight feet. Other suitable allocations and lengths will be defined based on the particular user's circumstances, including converting facilities and market conditions.

Another item of data will be a series of elongated objects, such as representations of long logs, containing the two dimensional outline of each object in X-Y coordinate pairs and optionally other intrinsic properties of each object. As an example, when the simulated object is a long log, the representation may include taper, curvature or sweep, and numbers and locations of knots, as well as overall length and diameter. When one of the elongated objects is displayed on the visual display, the visual representation of the stored data will be perceived by the user as, for example, a simulated long log. In addition, information can be displayed to indicate the object's length and diameters.

For each elongated object in the data file there is a predetermined preferred segmentation and allocation pattern. Each pattern is specified by segment lengths and allocations.

Another data item is a utility tale specifying the utility value of a segment of an elongated object by parameters based on the geometry and other intrinsic properties of the segment. For example, in the simulation process for long log merchandising, a plyblock having the given dimensions and characteristics will have a certain predetermined assigned dollar value stored in the utility or value table. The utility table in a preferred embodiment has dollar values, but other units representing other forms of utilities for the segments may be used.

An additional necessary data item is an evaluation algorithm which computes in the data processor the necessay parameters for the utility table of a segment based on the position of the segment in the elongated object, the geometry of the object, and other intrinsic characteristics of the elongated object. Such an algorithm is well within the skill level of one having ordinary skill in the art to write and program into the computer.

Once the system designer and builder has completed preparation of the data items in machine readable form, the user may then begin practicing the interactive process of the present invention. The numbered steps to be described in carrying out the process will correspond to the logic flow diagram and numbered blocks of FIG. 5. The visual representations shown in FIGS. 1-4 occurring at certain steps will be described in conjunction with the pertinent step.

The process steps are as follows:

1. Load parameter table, utility table, and evaluation algorithm into the memory unit of the computer.

2. Prompt user to select an elongated object number to access from memory; user responds with programmable function key selection of either "next object" (which selects the first object in the data base if no previous selection was made), or "object number" in which event the user will next enter that number using the keyboard.

3. If the same object is beng requested, and therefore is already in memory, go to Step 5.

4. Find appropriate object in the data base and load object and preferred division and allocation pattern into memory.

5. Display the geometric outline of the object on an area of the display, along with other intrinsic characteristics of the object. FIG. 1 is an example of a visual representation of an elongated object (in the embodiment depicted a long log), and includes a title and object number block and a scale allowing the user to judge accurately the dimensions of the simulated long log. The log is segmented into four foot increments again to allow the user to make more accurate estimates and decisions. The log is displayed including taper with the large end on the left tapering to the small end on the right, again simulating an actual long log. In additon, numbers are displayed in the object and represent the numbers and locations of knots along the simulated long log. In FIGS. 2 and 3, the title block and scale are omitted since they are not needed for the particular steps.

6. Prompt the user to select length of next segment to divide. Usually the selection will be made judging from left to right along the length.

7. The user may select either a length (by activating the appropriate function key corresponding to a length) or may allocate the remainder of the object to the default allocation specified in the parameter table (also by activating the appropriate function key). If the latter is done, go to Step 9.

8. Prompt user to select the allocation for the segment; user selects appropriate function key corresponding to the selected allocation. A line is drawn through the object vertically indicating the position of the division.

9. The allocation chosen and the segment length are displayed above or below the dividing line. In FIG. 2, for a long log, the first segmentation is selected at eight feet from the large end and is allocated to plywood.

10. Execute the evauation algorithm using the segment of the object specified by Steps 7-9. Look up the utility value for the segment in the utility table and store the utility value along with the parameters computed for the utility table by the evaluation algorithm. Sum the utility value of the segments and store in memory.

11. If there is more of the object for the user to divide into segments and allocate, go to Step 6; otherwise, continue to Step 12.

12. Display the utility value of each segment and the sum of the values of all segments.

13. Display another representation of the object in an area of the display spaced from the display of Steps 5–12 with the stored preferred division and allocation pattern superimposed; compute, store and display the utility values of the stored preferred pattern segments and of their sum by evaluating each segment as carried out in Step 10. An exemplary display is depicted in FIG. 3 and graphically shows the comparison between the user-determined segmentation and its value and the optimum or preferred segmentation pattern and its value.

14. Permit user to display (by activating the appropriate function key) information for each segment; this information consists of the parameters computed by the evaluation algorithm in Steps 10 and 13.

15. Accumulate the number of objects processed, the user utility values, and the stored preferred pattern utility values; permit user to display totals and/or to clear totals by activating appropriate function keys; go to Step 2 for additional use of interactive simulation process. In FIG. 4, an exemplary display is depicted for Step 15 and includes the number of objects processed by the user, the value of optimum segmentation and allocation pattern and the value of the user-determined segmentation and allocation pattern.

At any time during the process, the user may select the "stop" function switch, causing the process to stop and to display the totals as specified in Step 15. Once the process has been stopped in this manner, it may be restarted by activating the "restart" function switch.

By the user carrying out the steps in the simulated process interactively, it will be appreciated that the user, as he devotes more time to increasing his proficiency in decision-making, will be able to make better operating decisions when segmenting and allocating real objects. Other types of users may also find the simulated process to be of value as an analysis tool.

Many modifications will occur to those skilled in the art and all such modifications are intended to be included within the scope of the appended claims.

We claim:

1. An interactive simulated process for segmenting and allocating objects including a user and a display and input unit coupled to a programmable data processing system having a memory, including the steps of:

loading a parameter table, utility table, series of objects including a preferred segmentation pattern and allocation, and an evaluation algorithm into the memory, prompting the user to select at least one of the stored objects for visual display through the input unit, displaying the geometric outline of the selected object on an area of the display and loading the object and its preferred segmentation and allocation into the memory, inputting a user decision with respect to at least where the object will be segmented, executing the evaluation algorithm using the user decision for at least the segmentation and a default allocation, storing the calculated utility and parameters in the memory, and displaying a visual comparison of the user decision and of the preferred decision.

* * * * *